(12) United States Patent
Eipper

(10) Patent No.: US 8,998,296 B2
(45) Date of Patent: Apr. 7, 2015

(54) METHOD FOR PRODUCING A BODY SHELL OF A MOTOR VEHICLE AND BODY SHELL FOR A MOTOR VEHICLE

(75) Inventor: Konrad Eipper, Rottenburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/514,777

(22) PCT Filed: Oct. 26, 2010

(86) PCT No.: PCT/EP2010/006522
§ 371 (c)(1),
(2), (4) Date: Jul. 9, 2012

(87) PCT Pub. No.: WO2011/069581
PCT Pub. Date: Jun. 16, 2011

(65) Prior Publication Data
US 2012/0280534 A1 Nov. 8, 2012

(30) Foreign Application Priority Data

Dec. 10, 2009 (DE) .......................... 10 2009 057 734

(51) Int. Cl.
| | | |
|---|---|---|
| B62D 25/00 | (2006.01) | |
| B62D 21/09 | (2006.01) | |
| B62D 25/02 | (2006.01) | |
| B62D 29/00 | (2006.01) | |

(52) U.S. Cl.
CPC .............. *B62D 21/09* (2013.01); *B62D 25/025* (2013.01); *B62D 29/005* (2013.01)

(58) Field of Classification Search
CPC ................................ B62D 65/00; B62D 65/02
USPC .................... 296/187.01, 187.02, 29, 203.01; 29/897.2; 703/2; 700/95, 97
See application file for complete search history.

(56) References Cited

U.S. PATENT DOCUMENTS

| | | | |
|---|---|---|---|
| 4,732,806 A | | 3/1988 | Wycech |
| 4,922,596 A | * | 5/1990 | Wycech ....................... 29/897.2 |
| 5,575,526 A | * | 11/1996 | Wycech ........................ 296/205 |
| 5,992,923 A | * | 11/1999 | Wycech ................... 296/187.02 |
| 6,165,588 A | * | 12/2000 | Wycech ........................ 428/122 |
| 6,199,940 B1 | * | 3/2001 | Hopton et al. ........... 296/187.02 |
| 6,253,524 B1 | * | 7/2001 | Hopton et al. .................. 52/843 |
| 6,311,452 B1 | * | 11/2001 | Barz et al. ..................... 296/207 |
| 6,455,126 B1 | | 9/2002 | Wycech |
| 6,475,577 B1 | * | 11/2002 | Hopton et al. ............... 428/34.7 |
| 6,523,884 B2 | * | 2/2003 | Czaplicki et al. ........ 296/187.03 |

(Continued)

FOREIGN PATENT DOCUMENTS

| | | |
|---|---|---|
| DE | 43 18 080 A1 | 4/1994 |
| DE | 196 53 509 A1 | 6/1998 |

(Continued)

OTHER PUBLICATIONS

Corresponding International Search Report with English Translation dated Mar. 4, 2011 (seven (7) pages).

(Continued)

*Primary Examiner* — Gregory Blankenship
(74) *Attorney, Agent, or Firm* — Crowell & Moring LLP

(57) ABSTRACT

A method for producing a body-in-white of a passenger car is provided. A support structure assigned to the body-in-white of the motor vehicle and which includes at least one support part is produced. The support part of the support structure is, depending on a variant of the motor vehicle, at least in some regions provided with at least one reinforcing part.

10 Claims, 1 Drawing Sheet

(56) References Cited

U.S. PATENT DOCUMENTS

| | | | |
|---|---|---|---|
| 6,729,425 B2 * | 5/2004 | Schneider et al. | 180/68.5 |
| 6,786,533 B2 * | 9/2004 | Bock et al. | 296/187.02 |
| 6,890,021 B2 * | 5/2005 | Bock et al. | 296/187.02 |
| 6,896,320 B2 * | 5/2005 | Kropfeld | 296/203.01 |
| 7,025,409 B2 * | 4/2006 | Riley et al. | 296/187.03 |
| 7,114,763 B2 * | 10/2006 | Riley et al. | 296/187.03 |
| 7,194,804 B2 * | 3/2007 | Czaplicki | 29/897.2 |
| 7,318,873 B2 * | 1/2008 | Czaplicki et al. | 156/71 |
| 2008/0136214 A1 * | 6/2008 | Harrison, III et al. | 296/107.17 |

FOREIGN PATENT DOCUMENTS

| | | |
|---|---|---|
| DE | 103 53 235 B3 | 3/2005 |
| DE | 10 2005 043 698 A1 | 3/2007 |
| JP | 59-155037 | 9/1984 |
| JP | 60-199774 A | 10/1985 |
| JP | 2-125484 | 10/1990 |
| JP | 5-116648 A | 5/1993 |
| JP | 2007-191008 A | 8/2007 |
| JP | 2007-296938 A | 11/2007 |

OTHER PUBLICATIONS

Form PCT/ISA/237 (seven (7) pages).

Japanese-language Office Action dated Aug. 21, 2013 (five (5) pages).

* cited by examiner

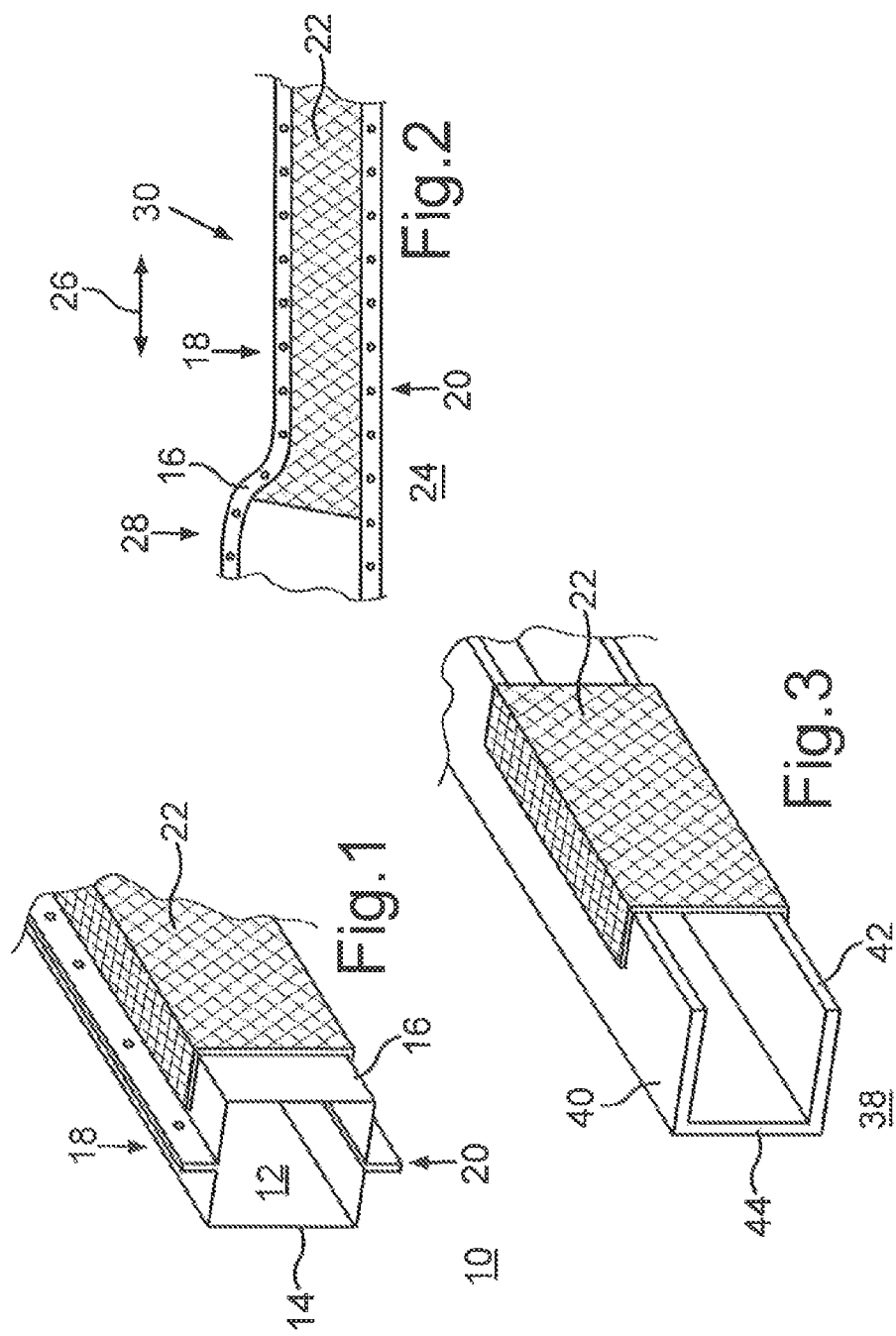

METHOD FOR PRODUCING A BODY SHELL OF A MOTOR VEHICLE AND BODY SHELL FOR A MOTOR VEHICLE

BACKGROUND AND SUMMARY OF THE INVENTION

German Patent Document DE 43 18 080 A1 discloses the use of an at least substantially identically constructed driver's cab structure for different variants of a commercial vehicle. The different vehicle variants being implemented by fitting to the body-in white different cladding parts or by installing a window instead of a cladding part. It is further proposed that the non-load-bearing cladding parts, which are not part of the body-in-white structure, can if required be provided with reinforcements for attaching safety belts and that, in cladding parts designed as hollow sections, these reinforcements can be placed within the hollow section. It is further proposed that guides for sliding doors should be integrated into a cladding part, which requires that the cladding part is cut open.

German Patent Document DE 10 2005 043 698 A1 discloses a side skirt of a motor vehicle body with a box section composed of at least two part-shells, which is reinforced by a structural part in the region of the occupant cell, the structural part being permanently joined to the box section. The structural part comprises a fiber-reinforced plastic part which is supported on at least one of the part-shells of the box section.

From standard motor vehicle production it is further known that bodies-in-white of passenger cars can be adapted to different load levels by building variants of the body-in-white. If this multitude of body-in-white variants is to be avoided, the body-in-white of the passenger car has to be designed in accordance with the heaviest vehicle, i.e., the body-in-white is reinforced as heavy as the heaviest vehicle requires. This means, however, that all lighter vehicles would have a body-in-white that is reinforced to an excessive degree and therefore excessively heavy. For the lighter vehicle variants, this results in increased costs and increased $CO_2$ emissions owing to the unnecessary excess weight of the body-in-white, which is over-dimensioned for such lighter vehicles.

Exemplary embodiments of the present invention are directed to a method for producing a body-in-white of a motor vehicle and a body-in-white for the motor vehicle that reduces the costs of the motor vehicle.

The method according to the invention for producing a body-in-white of a motor vehicle, in particular of a passenger car, involves producing a support structure that is assigned to the body-in-white of the motor vehicle and which comprises at least one support part, providing the support part of the support structure, depending on the variant of the motor vehicle, at least in some regions, with at least one reinforcing part. If the support part is provided with the reinforcing part after the support structure has been produced, this offers the advantage that the number of body-in-white variants for different variants of the motor vehicle is at least significantly reduced, thereby reducing the costs of the body-in-white and the overall costs of the motor vehicle.

With the method according to the invention, platforms that advantageously lower the cost of the motor vehicle can be used even for different variants of the motor vehicle, the bodies-in-white of which have to meet different requirements, and a wide spectrum can be covered in the behavior of the motor vehicle in an accident. At the same time, the number of body-in-white variants can be kept low, or different variants may even be avoided. The method according to the invention offers the further advantage that the body-in-white or the support structure respectively can be designed for the variant that has the lowest weight of all the variants of the motor vehicle. If a variant of the motor vehicle has a higher weight and therefore required a strengthened and reinforced body-in-white or a strengthened and reinforced support structure, this can be achieved with the body-in-white or the support structure designed for the lowest weight by providing the at least one support part of the support structure with the reinforcing part, the reinforcing part being arranged on the support part in a load-level-oriented way, i.e., as a function of a loading in an accident. The reinforcing part is advantageously fitted after the body-in-white or the support structure has been produced.

This loading in an accident is, for example, determined before the support part is provided with the reinforcing part or even before the start or at least before the end of the production of the support structure or the body-in-white, this determination being for example based on simulation, calculation, and/or experiments. Depending on the results obtained in this way, the support part with the reinforcing part is then placed at suitable points, in particular points of high loading.

This allows for a variant control and therefore for a cost reduction and a weight reduction in basic types. With the method according to the invention, it is no longer required to design the body-in-white for the heaviest variant of the motor vehicle, in which case even the lightest variants would have to have a body-in-white designed for the heaviest variants, which would have a detrimental effect on their weight.

The method according to the invention can also be used in derivatives, for example such variants as a coupe, a convertible, a van, a roadster or other variants without a roof or with a roof which can be opened and closed. The cost-reducing effect of the method according to the invention is particularly beneficial if large numbers and many different variants are produced.

Within the framework of the method according to the invention, it may, for example, be provided that joint elements of the support structure or the body-in-white are reinforced with at least one reinforcing part. A plurality of such reinforcing parts is perhaps provided, which are positioned and arranged in a load-level-oriented manner on the support part or the support structure, which may comprise a plurality of such support parts. Such a reinforcing part may for example be supported on the support part.

At this point, it should be noted that the support part is formed, for example, from two part-shells that are joined to each other via respective joining flanges, for example by spot welding and/or bonding or the like, the reinforcing part being supported, for example, on a part-shell which may, for example, be made of sheet metal. It may also be provided that the reinforcing part encompasses a section and for example the major part of the support part or of such a part-shell.

In an advantageous embodiment of the invention, the support part is provided with the reinforcing part after a coating, paint, in particular applied by dip painting, or the like has been applied. If the reinforcing part is, for example, made of a fiber-reinforced plastic material, this offers in the present context the advantage that a plastic matrix of the reinforcing part can then be cured by the heat involved in the painting process, in particular in the cathodic dip painting process. This allows the parallel arrangement of processes, resulting in a time reduction and therefore a further cost reduction for the method, the body-in-white and the motor vehicle as a whole. The fiber-reinforced plastic material may, for example, be a glass fiber-reinforced plastic, a carbon fiber-reinforced plastic or the like.

In a further advantageous embodiment of the invention, a reinforcing part which is at least substantially made of aluminum is provided, the reinforcing part then having a very low specific weight with beneficial effects on the total weight of the support structure and thus of the motor vehicle. This keeps the energy required for the operation of the motor vehicle low, which in the case of a drive unit designed as an internal combustion engine results in low fuel consumption and low $CO_2$ emissions.

It may also be provided that a reinforcing part substantially made of steel is provided. This then is a particularly rigid and stable reinforcing part by means of which the support structure or the support part is reinforced in a particularly efficient manner. If the reinforcing part is made of steel or of sheet metal, it is further possible to optimize the behavior of the support structure or the support part in an accident by at least one bead of the reinforcing part. In this context, it should be noted that, if the reinforcing part is at least substantially made of a fiber-reinforced plastic material, the fibers of the fiber-reinforced plastic material can be oriented to match the loading, thereby adapting the behavior of the support part and thus of the entire support structure in an accident to requirements.

The material of the reinforcing part that is at least substantially made of aluminum is, for example, a higher-strength aluminum material. The material of the reinforcing part that is at least substantially made of steel is, for example, a thermoformed steel, and the material of the reinforcing part that is at least substantially made of a plastic material is, for example, carbon fiber-reinforced patches (CFRP patches).

The at least one reinforcing part is joined to the at least one support part using conventional joining technologies, for example. The reinforcing part may, for example, be bonded and/or riveted to the support part. If the support part is provided with the reinforcing part after the coating process, in particular after cathodic dip painting, bonding is a particularly suitable technology for joining the reinforcing part to the support part, particularly if the reinforcing part is at least substantially made of fiber-reinforced plastic; another suitable method is riveting. When using the bonding technology, an adhesive provided for joining the reinforcing part to the support part can be cured particularly well by the heat involved in the coating process, which saves more time and therefore reduces costs even further. The joining technology has to be adapted to the point of installation and/or to the type and degree of the loading prevailing there.

The invention further includes a body-in-white for a motor vehicle, in particular for a passenger car, and a support structure comprising at least one support part. According to the invention, the support part can, depending on the variant of motor vehicle, be provided with at least one reinforcing part at least in some regions, wherein the support part can advantageously be provided with the reinforcing part after the support structure has been produced. Advantageous further developments of the method according to the invention should be considered as advantageous further developments of the body-in-white according to the invention and vice versa.

The body-in-white according to the invention likewise allows for a late variant control and at least for a reduction of the number of body-in-white variants across different variants of the motor vehicle. According to the invention, the reinforcing part is fitted after the body-in-white or the support structure respectively has been produced and does not have to be fitted during the production of the body-in-white. This significantly standardizes the body-in-white assembly of different motor vehicle variants, resulting in a noticeable time and cost reduction for the body-in-white and thus for the motor vehicle as a whole.

Further advantages, features and details of the invention can be derived from the following description of several preferred embodiments and from the drawing. The features and feature combinations mentioned in the above description and the features and feature combinations described below in the description of the figures and/or shown in the figures only can be used not only in the specified combination, but also in other combinations or individually without exceeding the scope of the invention.

BRIEF DESCRIPTION OF THE DRAWING FIGURES

Of the drawing:

FIG. 1 is a section of a perspective view of a support part of a support structure assigned to a body-in-white of a passenger car, the support part being provided with a reinforcing part in some regions, depending on a variant of the passenger car;

FIG. 2 is a section of a side view of an alternative embodiment of a support part according to FIG. 1; and FIG. 3 is a section of a perspective view of a further embodiment of a support part according to the preceding figures.

DETAILED DESCRIPTION

FIG. 1 shows a support part in the form of a side member 10 made up from a half-shell 14 and a second half-shell 16 that are joined together by way of respective joining flanges 18 and 20 to form a hollow section 12. The half-shells 14 and 16 are joined by spot welding along the joining flanges 18 and 20.

The side member 10 shown in FIG. 1 may, for example, be a support part of a first support structure of a body-in-white of a passenger car, the support structure for example comprising a plurality of such side members 10 and other support parts.

Depending on a variant of the passenger car, the side member 10 is now provided in some regions with a reinforcing part 22, the reinforcing part 22 being made, for example, of a fiber-reinforced plastic material. The side member 10 is reinforced with the reinforcing part 22 depending on the variant of the passenger car and after the support structure or the body-in-white of the passenger car has been produced, which offers the possibility of adapting the body-in-white in a load-level oriented manner to the variant of the passenger car and thus to the different weights of the different variants. As a result, different variants can have the same body-in-white, which is then adapted to different requirements, in particular in terms of a good behavior of the different variants in an accident, by using suitable reinforcing parts such as the reinforcing part 22.

This allows for a late variant control and for an avoidance of large numbers of body-in-white variants, resulting in low costs for the body-in-white and the passenger car as a whole.

In this context, it becomes clear that the reinforcement of the side member 10 by the reinforcing part 22 as shown in FIG. 1 is only an example. In another variant, an entirely different strengthening or reinforcement by the reinforcing part 22 may be provided, or there may even be no such reinforcement. The design of the reinforcing part 22, i.e., its material, dimensions, wall thickness and/or geometry, as well as its location on the side member 10, vary with the variant and the different loadings if the support structure or the body-in-white respectively is subjected to forces in an accident. These different loadings by forces in an accident result, for example, from different weights of the different passenger car variants. These loading are, for example, determined by simulation. The results of these investigations may, for example, be highly loaded points of the side member 10, the support structure or the body-in-white, where suitably designed reinforcing parts such as the reinforcing part 22 are placed.

FIG. 2 shows a support part in the form of a sill 24, which is likewise made up of two half-shells 14 and 16 of which only the half-shell 16 is shown in FIG. 2. The half-shells 14 and 16 are likewise joined to each other by spot welding by way of joining flanges 18 and 20.

As FIG. 2 shows, the sill 24 has different hollow cross-sections along its length according to a directional arrow 26. In the front region 28 the cross-section is larger than in a rear region 30. To compensate for these different hollow cross-sections, a reinforcing part 22 is once again provided which, as explained with reference to FIG. 1, is designed and arranged on the sill 24 in dependence on the variant of the passenger car and the loading of the body-in-white or the support structure when subjected to forces in an accident. The reinforcing part 22 according to FIG. 2 is, for example, used to reinforce the sill 24 in a convertible variant of the passenger car.

The adjustment of the different hollow cross-sections in the regions 28 and 30 means that, for example, the hollow cross-section in the region 28 offers an adequate rigidity and strength of the sill 24, while the hollow cross-section in the region 30 requires improved rigidity in a convertible variant of the passenger car if no other measures have been taken. The rigidity of the sill 24 is significantly improved in the region 30 by the reinforcing part 22, so that a light-weight sill 24 acquires an adequate rigidity in this variant by reinforcement with the reinforcing part 22, resulting in an excellent behavior of the passenger car in an accident. At this point, it should be noted that the sill 24 may be a part of a support structure of a body-in-white of a passenger car, in particular a part of the support structure of the body-in-white of the passenger car described with reference to FIG. 1. The explanations referring to the different variants in the context of the description of FIG. 1 apply to the sill 24 according to FIG. 2 in an analogous manner.

The same applies to a support part in the form of a bumper bracket 38 as shown in FIG. 3, which is provided with a reinforcing part 22 depending on a variant of the passenger car.

The bumper bracket 38 has an open C-shaped cross-sectional profile comprising an upper flange 40, a lower flange 42 and a web 44 connecting the flanges 40 and 42. For reinforcing the bumper bracket 38 by means of the reinforcing part 22, the reinforcing part 22 encompasses some sections of the flanges 40 and 42 and is situated on the open side of the C-shaped cross-sectional profile in order to form a closed hollow section in some regions. In the region of the reinforcing part 22, the bumper bracket 38 has a high rigidity and strength, which is particularly beneficial for the behavior of the motor vehicle when subjected to forces in an accident. The region where the reinforcing part 22 is provided may, for example, be a middle region or a region subjected to highest loads, which is determined in the process of simulating such accident-related forces and/or in experiments.

When considering FIGS. 1 to 3 together, it becomes clear that the different variants of the passenger car can have the same body-in-white or the same support structure assigned to the body-in-white, wherein the body-in-white can be adapted, depending on the variant of the passenger car, in particular depending on different weights across the different variants, to the loading experienced when subjected to forces in an accident. This allows for a late variant control and for an avoidance of large numbers of body-in-white variants, resulting in low costs for the body-in-white and the passenger car as a whole.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method comprising:
    producing a support structure that is assigned to a body-in-white that is configured for a plurality of variants of a motor vehicle, wherein the support structure comprises at least one support part;
    identifying a particular variant of the plurality of variants of the motor vehicle; and
    selectively providing at least in some regions of the support part of the support structure with at least one reinforcing part depending upon the particular variant of the plurality of variants of the motor vehicle,
    wherein the body-in-white is structurally configured for loadings by forces in an accident for a variant having the lowest weight of all variants of the motor vehicle and loadings by forces in an accident for variants having higher weights than the lowest weight variant are compensated for using the support structure with the selectively provided at least one reinforcing part.

2. The method according to claim 1, wherein the support part is provided with the reinforcing part after the support structure has been produced.

3. The method according to claim 1, wherein the support part is provided with the reinforcing part after a coating or a paint applied by dip painting has been applied.

4. The method according to claim 1, wherein the reinforcing part is made at least substantially of aluminium.

5. The method according to claim 1, wherein the reinforcing part is made at least substantially of steel.

6. The method according to claim 1, wherein the reinforcing part is joined to the support part by bonding or riveting.

7. The method according to claim 1, wherein a material, dimensions, wall thickness, or geometry of the at least one reinforcing part is different for different ones of the plurality of variants of the motor vehicle.

8. The method according to claim 1, wherein a location of the support part on which the at least one reinforcing part is selectively provided is different for different ones of the plurality of variants of the motor vehicle.

9. The method of claim 1, wherein the plurality of variants of the motor vehicle include a convertible motor vehicle and a fixed-roof motor vehicle.

10. A method comprising:
    producing a support structure that is assigned to a body-in-white that is configured for a plurality of variants of a motor vehicle, wherein the support structure comprises at least one support part;
    identifying a particular variant of the plurality of variants of the motor vehicle; and
    selectively providing at least in some regions of the support part of the support structure with at least one reinforcing part depending upon the particular variant of the plurality of variants of the motor vehicle,
    wherein the body-in-white is structurally configured for loadings by forces in an accident for a variant having the lowest weight of all variants of the motor vehicle and loadings by forces in an accident for variants having higher weights than the lowest weight variant are compensated for using the support structure with the selectively provided at least one reinforcing part, wherein the reinforcing part is a fibre-reinforced plastic material patch having a plastic matrix and that is applied to the support part using adhesive, wherein the support part is provided with the reinforcing part after a coating or a paint applied by dip painting has been applied and the plastic matrix and the adhesive are cured by heat that is used to cure the coating or paint.

* * * * *